United States Patent Office 3,319,299
Patented May 16, 1967

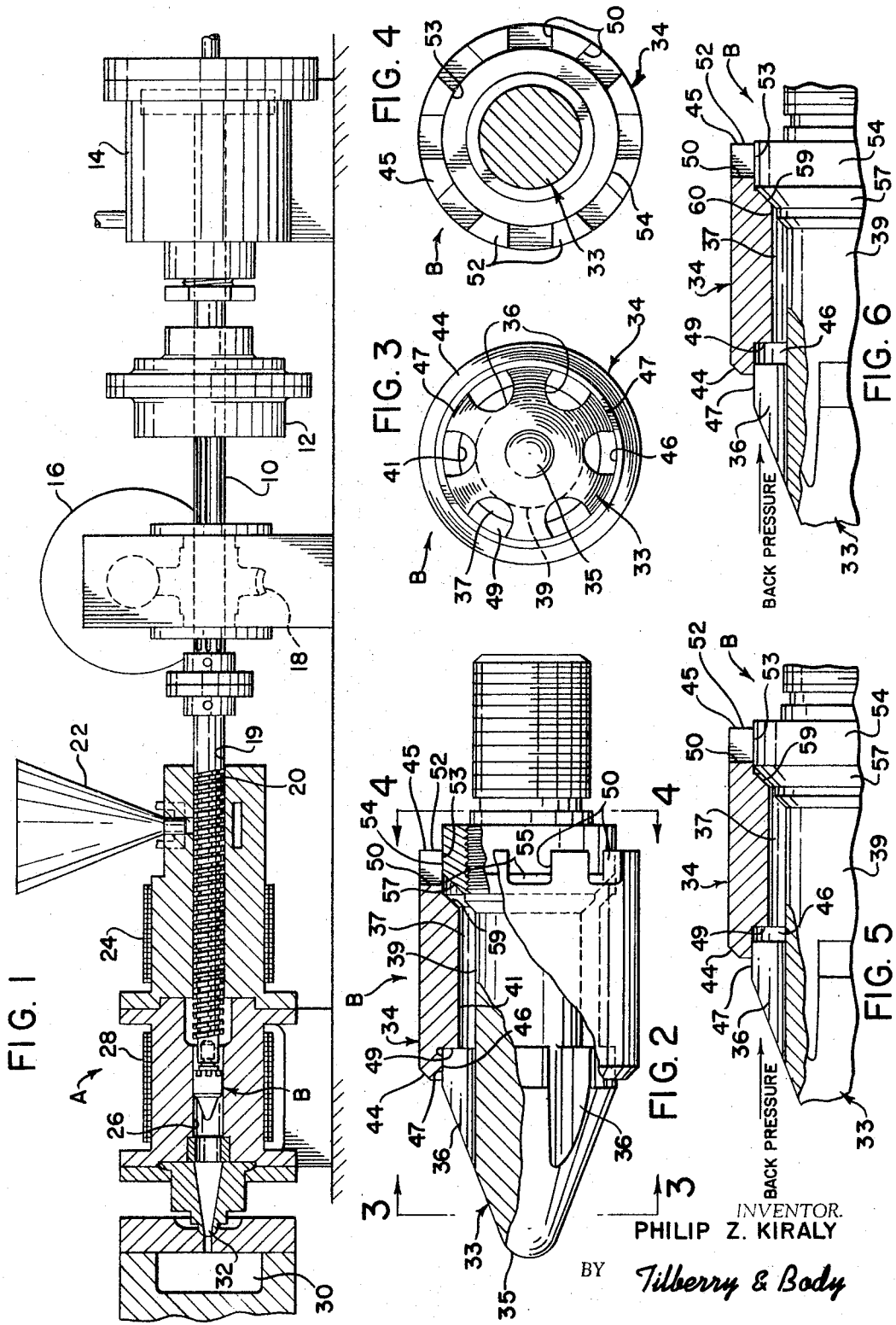

3,319,299
INJECTION MOLDING NOZZLE
Philip Z. Kiraly, Seven Hills, Ohio, assignor to Van Dorn Company, Cleveland, Ohio, a corporation of Ohio
Filed Apr. 19, 1965, Ser. No. 449,080
6 Claims. (Cl. 18—30)

This invention pertains to the art of injection molding and more particularly to injection molding in an apparatus having an operating cycle which involves heating and feeding thermoplastic material into a chamber and then forcefully injecting the heated plastic material into a mold cavity.

More specifically the invention is particularly applicable to a nozzle used in apparatus of this type for applying the injection molding pressure and will be described with particular reference thereto although it should be appreciated that the invention has much broader applications and may be used in other situations where batches of softened material are to be expressed through a die or into a mold.

Injection molding machines of the type to which this invention pertains generally comprise an elongated screw having a nozzle on one end which the screw rotates and reciprocates in an elongated heated bore having an inlet adjacent one end for unheated plastic and a restricted outlet at the other end into a mold cavity. As the screw rotates, unheated plastic is advanced through the bore, heated and discharged through the nozzle into the bore adjacent the outlet. As the plastic is discharged the screw and nozzle retract to make room therefor. When the proper amount of plastic is deposited, the screw is forcefully advanced toward the outlet. The nozzle includes in combination a valve which first automatically closes and then the heated plastic is discharged under high pressure through the outlet into the mold cavities. The cycle then starts over, the valve automatically opening to allow flow of the plastic through the nozzle.

The function of the nozzle valve is to automatically close when the injecting cycle starts to prevent backflow of the hot plastic material. One of the disadvantages with such valves has been the tendency to imperfectly seal thus allowing the rearward escape of some of the hot plastic causing a misrun due to the mold cavity not being filled sufficiently. This may be caused due to the very high pressure on the forward end of the nozzle which creates a tendency for the valve element to cock in relation to the bore when the injection molding pressure is applied thus preventing its proper seating.

Another problem with such nozzle valves is the tendency to jam open when a piece of plastic which has not been uniformly heated throughout gets caught between the sealing surfaces preventing the valve from completely closing.

The present invention is directed toward the objective of overcoming these and other difficulties, and provides an injection molding nozzle having a new and improved valving action to insure positive seating at the beginning of each injection cycle.

In accordance with the broadest aspect of the invention there is provided an injection molding nozzle having a passage open at both ends through which plastic is fed, a valve seat within the passage, and a movable valve shuttle guided strictly for rectilinear movement relative to the valve seat to open and close the feeding passage automatically in response to a pressure differential on the nozzle.

Further in accordance with the invention there is provided an injection molding nozzle including a cylindrical member having axially spaced pilot surfaces separated by a cylindrical midsection of reduced diameter and a valve shuttle guided at opposite ends by the pilot surfaces surrounding the midsection to define an annular feeding passage, the valve shuttle being guided for rectilinear movement by the pilot surfaces to close the passage in response to back pressure during the injection molding cycle and to open in response to the pressure of feeding new material through the passage.

Further in accordance with the invention the valve shuttle includes a plurality of circumferentially spaced ports at the trailing end thereof adapted to open and close the feeding passage by movement of the valve shuttle relative to the rear pilot surface, the movement tending to close the ports also being effective to shear off any plastic material tending to block movement of the valve shuttle to its rearmost seating position.

Further in accordance with the invention an axially facing frustoconical valve seat is formed within the passage and the valve shuttle has a rearwardly facing frustoconical sealing surface adapted to seat thereon when shifted to its rearmost position.

The invention has as the principal object the provision of an injection molding nozzle which is simple in construction, reliable in operation and will increase the output of the injection molding machine by increasing the number of cycles which can be performed without encountering a misrun.

Another object of the invention is to provide an injection molding nozzle having a longitudinally movable valve element positively guided in its valving action by the nozzle independently of surrounding structure such as the bore of the injection molding apparatus.

Still another object of the invention is the provision of a valving element in combination with an injection molding nozzle featuring a double valving action to insure against an imperfect seal and to prevent backflow of material during the injection cycle.

The invention may take physical form in certain parts and arrangements of parts in combination with structure the preferred embodiments of which will be described in detail in this specification and illustrated in the accompanying drawings which are part hereof and wherein:

FIGURE 1 is a side view of an injection molding machine employing a nozzle constructed in accordance with the invention;

FIGURE 2 is a view of the nozzle partially broken away showing the valve shuttle in its forward position;

FIGURE 3 is a front view of the nozzle taken along line 3—3 of FIGURE 2;

FIGURE 4 is a rear view of the nozzle taken along line 4—4 of FIGURE 2;

FIGURE 5 is a partial cross sectional view showing the initial closed position of the valve shuttle; and FIGURE 6 is a view similar to FIGURE 5 showing the valve shuttle in its fully seated position.

Referring now to the drawings wherein the showings are for the purpose of illustrating a preferred embodiment of the invention only and not for the purpose of limiting same, FIGURE 1 is exemplary of an injection molding machine A utilizing an injection molding nozzle B constructed in accordance with the invention. The general arrangement of parts of the machine A are conventional and form no part of the present invention and the description hereof is mainly for the purpose of understanding the operation of nozzle B.

The machine A includes a spline shaft 10 journaled in a bearing block 12 and connected at one end to a double acting cylinder 14 for imparting reciprocal motion thereto. A drive motor 16 is connected by means of a worm screw and gear arrangement 18 to the spline shaft 10 for imparting rotational movement thereto. An auger 19 is coupled to the spline shaft 10 at the forward end thereof and thus has imparted to it the rotational and reciprocal movement of the shaft 10. A bore 20 of the injection molding machine A receives the auger 10 with just sufficient clearance to permit free rotational and rectilinear movement thereof. A hopper 22 contains a supply of pellets formed of a thermoplastic compound and connects with the bore 20. The pellets may be of any suitable thermoplastic vinyl compound such as polyvinyl chloride, polystyrene or the like. It is well known that these materials include plasticizers or softening agents and as the pellets travel along the bore 20, fed by the auger 19, they are brought into intimate contact with the walls of the bore 20. The bore 20 is heated by an electric heating muff 24 so that as the pellets travel along the bore, they become heated. When softened sufficiently, the particles are masticated and kneaded together by the rotational movement of the auger 19. Continued rotation of the auger 19 forces the plastic through the nozzle B on the end of the auger 19 as explained hereinafter and into the chamber 26 which is heated by an electric muff 28. As the chamber 26 is filled, the auger 19 and nozzle B are retracted. When a plug of heated plastic has been deposited in the chamber 26 of sufficient volume to fill the mold cavity 30 upon injection and the plug is heated to the injection molding temperature, the cylinder 14 is moved rapidly forward driving the auger 19 and the nozzle B with it to inject the hot plug through the sprue 32 and into the mold cavity 30. At the completion of the injection cycle, the nozzle B is in its most forward position. By continued operation of the aguer 19, fresh plastic is deposited in the chamber 26 in front of the nozzle B and the assembly is gradually retracted by the cylinder 14 as the chamber 26 is filled in preparation for the next injection cycle.

With this brief explanation, the utility of the present invention will be more fully appreciated and for this purpose reference is now made to FIGURE 2 wherein the nozzle B is shown in enlarged detail. In accordance with the preferred embodiment of the invention, the nozzle B comprises a torpedo member 33 and a valve shuttle 34. The torpedo member 33 comprises a nose 35 having an annular array of ports 36 opening into an annular chamber 37 generally defined by a reduced diameter midsection 39 of the torpedo member 33 and an inner cylindrical surface 41 of the valve shuttle 34. The valve shuttle 34 is guided on the torpedo member 33 at its forward end 44 by a cylindrical surface 46 which slidably engages a plurality of circumferentially spaced, cylindrical pilot surfaces 47 on the nose 35. A radial shoulder 49 on the valve shuttle 34 limits its forward travel on the torpedo member 33. The trailing end 45 of the volve shuttle 34 has a plurality of U-shaped cutouts 50 formed by axially extending projections 52 each of which has a cylindrical inner surface 53 which is slidable on a cylindrical sealing land 54 of the torpedo member 33. Thus, in accordance with the invention, the valve shuttle 34 is guided for rectilinear movement within the bore of chamber 26 solely by the torpedo member 33. The importance of this feature will become apparent hereinafter.

As shown in FIGURE 2, the valve shuttle 34 is in its most forward position. In this position the chamber 37 opens at the rear through a plurality of ports 55 defined by the cutouts 50 so as to communicate the chamber 26 with the bore 20 when plastic is being fed forwardly through the nozzle B and into the chamber 26 by the auger 19.

In order to seal chamber 37 to prevent the backward extrusion of plastic during the injection cycle a seal is provided in the form of a frustoconical seal seat 57 which is adapted to engage a frustoconical sealing surface 59 on the value shuttle 34 when it is shifted to the rear as shown in FIGURE 6. The seal at 57 is the primary seal for closing chamber 37, however in accordance with a further aspect of the invention, a secondary seal is provided by the closing of ports 55 preliminary to the seating of surfaces 57, 59 as shown in FIGURE 5. The significance of this secondary seal will become apparent from the following.

During the feeding process the value shuttle 34 will remain in its forwardmost position as shown in FIGURE 2. The softened plastic will be squeezed by the rotational action of the auger 19 through the ports 55 and the chamber 37 and out the front of the nozzle through the ports 36. The distribution of material by the nozzle further masticates and mixes it and insures uniform heating. When sufficient plastic has been deposited in chamber 26 to form an injection plug, a back pressure will develop on the forward end 44 of the valve shuttle 34 tending to balance the forwardly acting pressure developed by the plastic being fed by the auger. When the plug is heated to the injection molding temperature, cylinder 14 is operated moving the auger 19 and nozzle B longitudinally forward at a rapid rate. At the initial movement of the auger 19, the pressure at the forward end 44 of the valve shuttle 34 will increase rapidly in relation to the pressure at the rear end 45. This practically instantaneous pressure unbalance moves the valve shuttle 34 rearwardly to first close ports 55 as shown in FIGURE 5. In the process, the plastic is sheared cleanly by the cutting action of the U-shaped cutouts 50 and with sufficient force so that any plastic pellets which have not been iniformly heated throughout will nevertheless be sheared by the cutting action described. At this point chamber 37 is closed at the rear and even if the valve shuttle 34 were to remain, as shown in FIGURE 5, with the primary sealing surfaces 57, 59 at a slight clearance, the injection cycle would still proceed without any danger of a misrun due to backflow of plastic through the chamber 37. Such may occur, for example, should a solid plastic pellet or the like, become trapped between the surfaces 57, 59 and prevent normal sealing. However, in the usual case, the valve shuttle 34 will be forced home to its extreme rear position, as shown in FIGURE 6. The plastic between the surfaces 57 and 59 is extruded forwardly through the annular clearance 60 into the chamber 37.

The nozzle B fits within the bore of chamber 36 with sufficient clearance to permit the valve shutle 34 to slide longitudinally back and forth and yet the clearance is small enough to prevent the backward extrusion of hot plastic adjacent the bore. Nevertheless this clearance, though small, is sufficient to allow the valve shuttle 34 to cock and possibly bind within the bore due to the extreme pressure at its forward end. In the event of binding, the chamber 37 would not be sealed during the injection cycle and a misrun would result. Thus it becomes important to provide for means to guide the valve shuttle 34 in a positive manner independently of the bore of chamber 26. In accordance with the present invention this is done by the cylindrical surfaces 47, 54 of the torpedo member 33.

At the conclusion of the injection cycle, the pressure on the forward end 44 of the valve shuttle 34 is reduced to normal. Continued operation of the auger 19 maintains the pressure so that the valve shuttle 34 is shifted to its forwardmost position as shown in FIGURE 2 whereby plastic once again is fed to the chamber 26.

While the invention has been described with reference to a particular apparatus and shown in the preferred embodiment by an arrangement of parts giving form to the invention, it should nevertheless be clear that certain modifications will occur to those having skill in the art and such modifications are intended to be covered by the appended claims except insofar as they are limited by the prior art.

I claim:

1. An injection molding nozzle for injecting a plug of heated plastic into a mold cavity comprising
   a feeding passage opening at opposite ends of the nozzle through which plastic is fed and deposited to form said plug, a valve seat within said passage, and a movable element guided strictly for rectilinear movement relative to the valve seat to open and close said passage, the passage being automatically closed in response to an increase in pressure at the forward end of the nozzle to prevent backflow of plastic through said passage.

2. An injection molding nozzle adapted for use in an injection molding machine having a bore opening into a mold cavity, said nozzle comprising:

a torpedo member having a valve seat and axially spaced guide means thereon, and a valve element slottedly mounted on said guide means for rectilinear movement within said bore relative to the valve seat and defining with said torpedo member a feeding passage through said nozzle automatically opened and closed in response to the movements of said valve element relative to said seat.

3. An injection molding nozzle as set forth in claim 2 wherein the torpedo member has a cylindrical midsection of reduced diameter intermediate the guide means and the valve element surrounds the midsection to define an annular chamber.

4. An injection molding nozzle as set forth in claim 3 wherein the guide means comprise cylindrical pilot surfaces and the valve element includes axially extending portions slidably engaging said pilot surfaces.

5. An injection molding nozzle as set forth in claim 4 wherein the axially extending portion at the trailing end of the valve element has a plurality of axially extending circumferentially spaced cutouts to define ports in cooperation with the rear pilot surface opening into said chamber.

6. An injection molding nozzle adapted for use in an injection molding machine having a longitudinal bore opening into mold cavity, said nozzle comprising a member having axially spaced plot surfaces separated by midsection of reduced cross sectional area, and a valve shuttle guided at its opposite ends by the pilot surfaces and surrounding the midsection to define a feeding passage through the nozzle, the valve shuttle being guided for rectilinear movement strictly by said pilot surfaces to close said passage in response to the back pressure on the nozzle during the injection molding cycle and to open the passage when the valve shuttle is shifted forwardly in response to the pressure of feeding plastic through the nozzle at the completion of the injection molding cycle.

References Cited by the Examiner

UNITED STATES PATENTS 3,001,234  9/1961  Renier _____ 18—30

FOREIGN PATENTS 615,178  2/1961  Canada.

J. SPENCER OVERHOLSTER, *Primary Examiner.*

W. L. McBAY, *Assistant Examiner.*